Jan. 25, 1966     O. D. EASLEY, JR     3,231,105

MATERIAL CONVEYING APPARATUS

Filed Dec. 2, 1963     5 Sheets-Sheet 1

OTHEL D. EASLEY, JR.
INVENTOR.

BY Browning, Simmons, Hyer & Eickenroht

ATTORNEYS

OTHEL D. EASLEY, JR.
INVENTOR.

ATTORNEYS

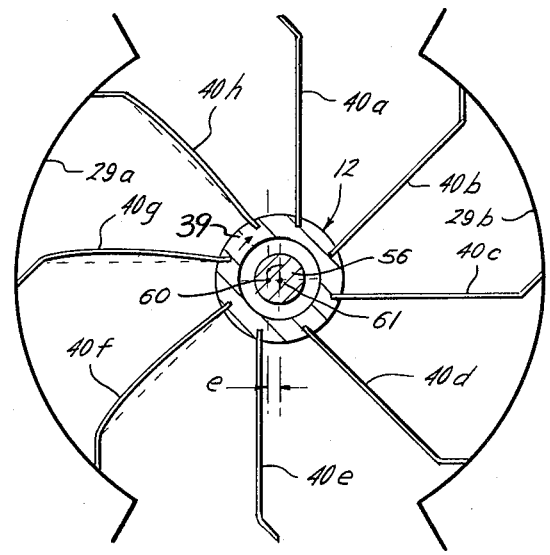
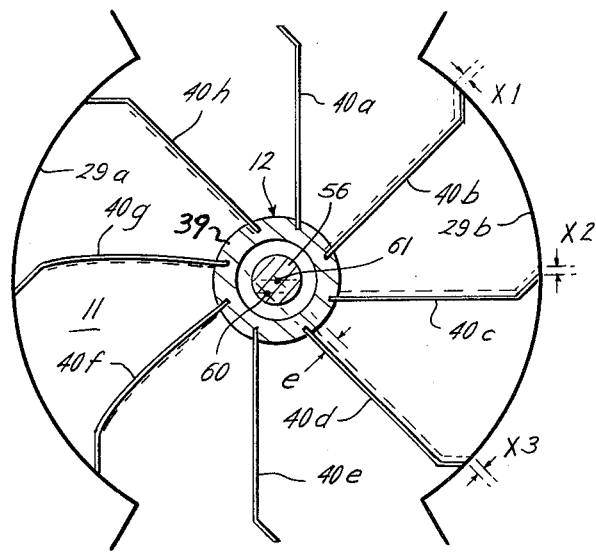

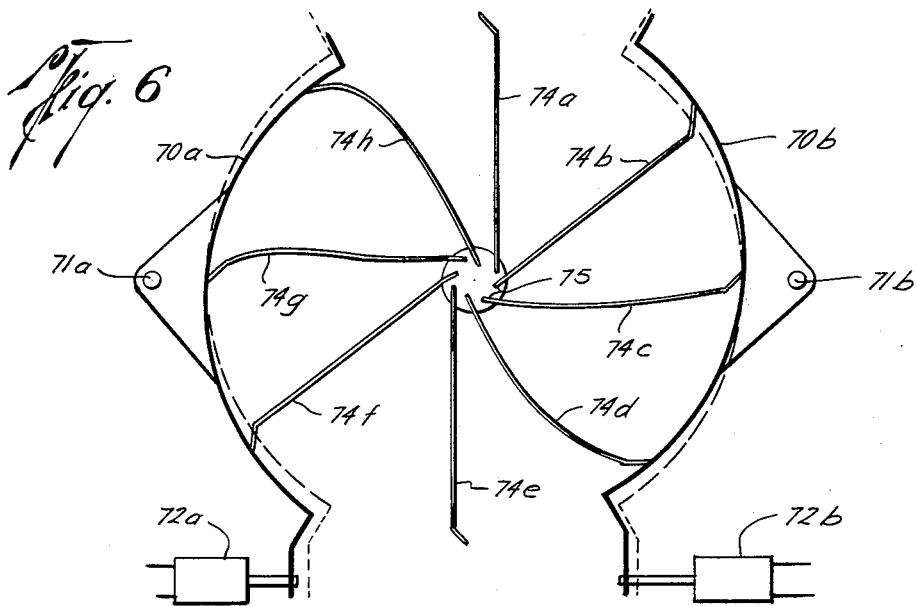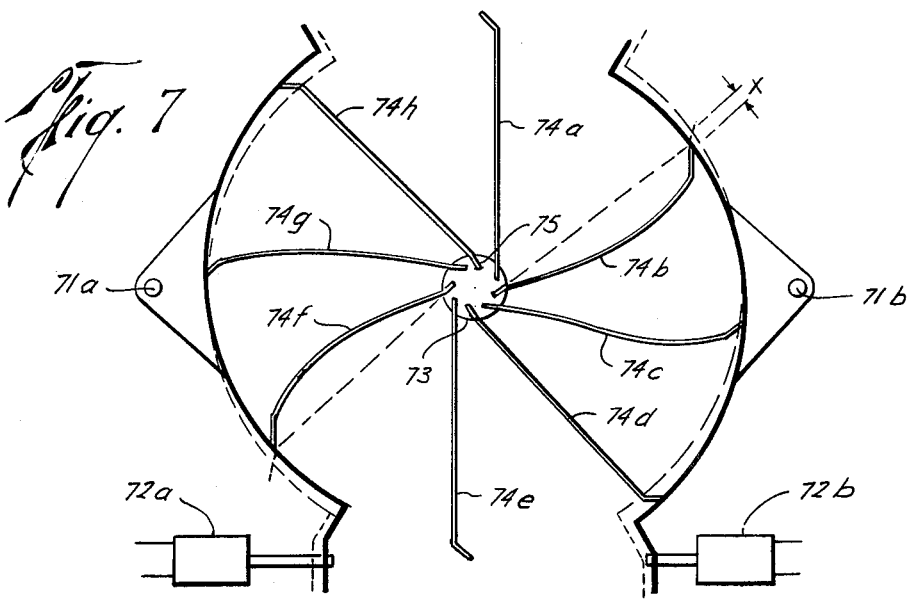

Jan. 25, 1966   O. D. EASLEY, JR   3,231,105
MATERIAL CONVEYING APPARATUS
Filed Dec. 2, 1963   5 Sheets-Sheet 5
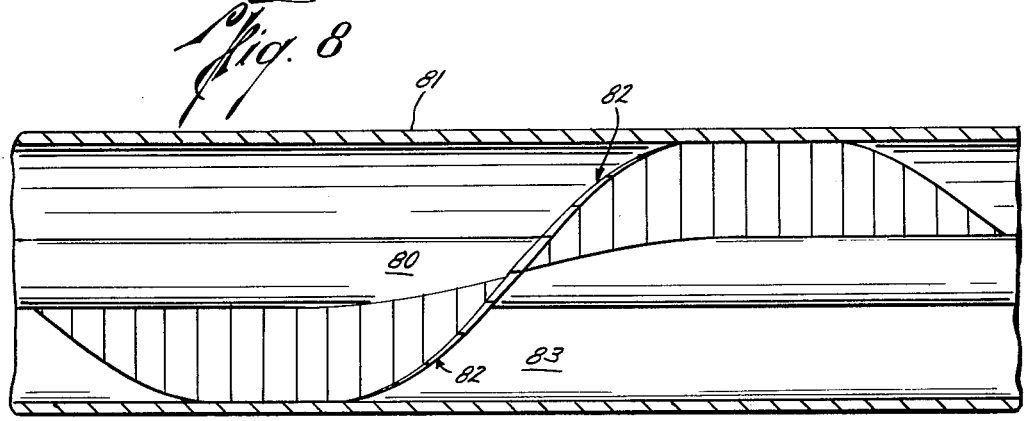
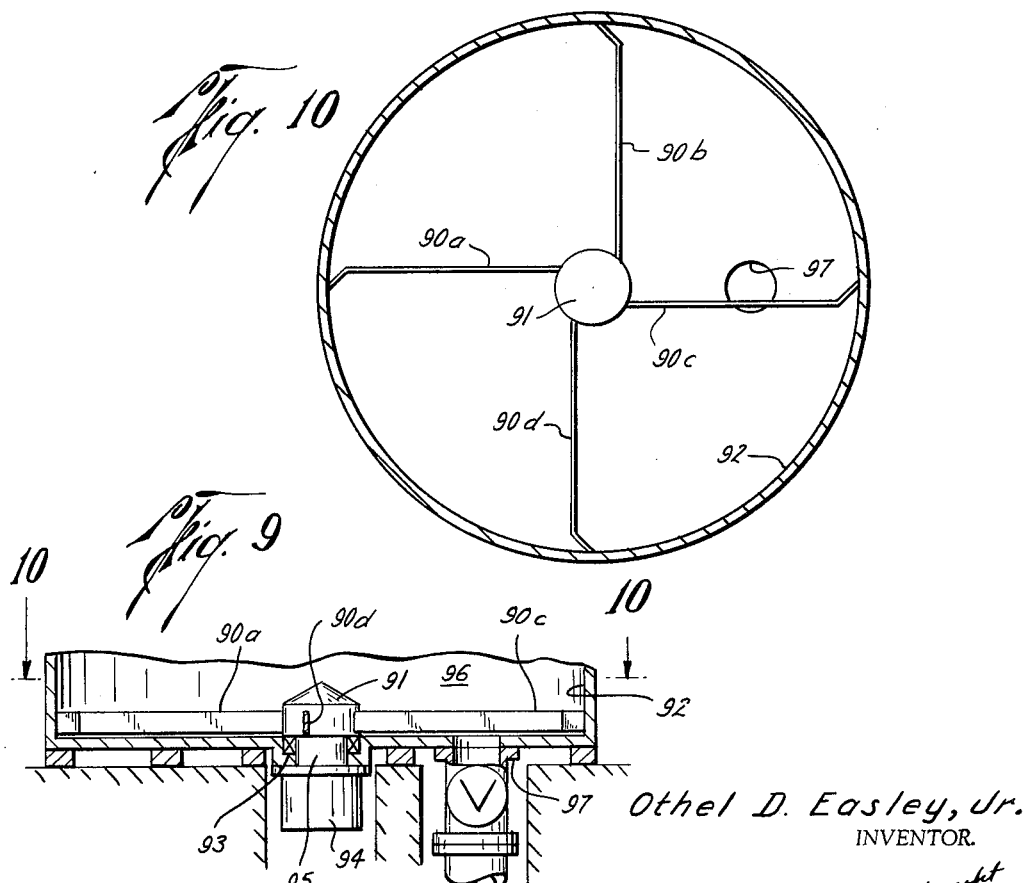
Othel D. Easley, Jr.
INVENTOR.
BY
ATTORNEYS

United States Patent Office 3,231,105
Patented Jan. 25, 1966

3,231,105
MATERIAL CONVEYING APPARATUS
Othel D. Easley, Jr., Houston, Tex., assignor to
James G. Brown, Houston, Tex.
Filed Dec. 2, 1963, Ser. No. 327,235
23 Claims. (Cl. 214—17)

This invention relates generally to mechanical apparatus for conveying material from one point to another. In particular this invention relates to material conveying apparatus, such as, rotary valves and screw conveyors, that employs a moving partition or vane to carry the material therethrough.

In conveyors of this type it is desirable for the partition or partitions to move at a relatively low speed. Normally this speed is such that it is impractical to use a direct drive from the power source to the conveyor. Thus, it is common practice to drive these conveyors through a speed reducer.

The use of speed reducers with conveying apparatus increases the cost of the equipment, the weight that must be supported, and the amount of machinery which must be serviced and maintained in connection with the operation of the conveyor. Therefore, it is an object of this invention to provide apparatus for conveying material which inherently operates at a speed which is substantially below the speed that it is driven.

It is another object of this invention to provide apparatus for conveying material which must be driven at a speed greater than the desired operating speed of the apparatus thereby providing a substantial portion of the speed reduction required between the driving motor and the conveying apparatus.

Conveyors of the type to which this invention relates are commonly used to handle materials such as pellets, capsules, pills, etc., where is it important that the material not be damaged as it passes through the rotary valve. Heretofore, this type conveyor was particularly troublesome in this respect, since the movement of the vanes along the inner walls of the container in which the conveyor was operating would tend to inherently cause a portion of the material to move outward along the vanes where it would be sheared between the outer end of the vanes and the walls of the container. The shearing of the material not only was undesirable since it damaged the material, but also because it increased considerably the wear of the vanes and the power necessary to rotate the vanes with respect to the container.

It is another object of this invention to provide material conveying apparatus wherein the vanes used to move the material tend to keep the material from being sheared between the vanes and the walls of the container.

It is another object of this invention to provide material conveying apparatus having vanes, for moving the material, which are moved in such a manner that they tend to prevent the material being conveyed from adhering to the vanes, which reduces the capacity of the apparatus and increases the power required to operate it.

Another object of this invention is to provide a liner for the inner arcuate walls of the container which form the cavity within which the rotor assembly of the conveying apparatus is located, which can be adjusted to compensate for the wear which occurs between the vanes of the apparatus and the liner.

It is another object of this invention to provide a novel method of assembling the rotor assembly of this invention.

These and other objects, features and advantages of this invention will be apparent to one skilled in the art from a consideration of the specification, attached drawings, and appended claims.

In accordance with the present invention, instead of directly driving the vanes of the material conveying apparatus to cause them to move relative to the container and thereby move the material in the container, the vanes are sequentially bent against the inner walls of the container which, in turn, causes a reactive movement of the vanes relative to the inner walls of the container. By imparting movement to the vanes in this manner, a large reduction is obtained between the speed at which the apparatus is driven and the speed that the vanes rotate in the container. Further, the vanes are caused to vibrate as they move which improves their ability to move the material in the container, to keep the material from being sheared between the vanes and the walls of the container, and to keep the material from adhering to the vanes.

The invention will now be described in detail in connection with three types of material conveying apparatus embodying this invention.

In the drawings:

FIG. 4 and FIG. 5 are schematic illustrations of the movement of the vanes relative to the hub and drive shaft of the rotary valve of FIG. 1 illustrating how successive bending of the vanes between the hub and the walls of the cavity in the valve body causes the vanes to rotate within the cavity at a fraction of the input speed of the drive motor of the valve;

FIGS. 6 and 7 are also schematic views illustrating an alternate embodiment of the rotary valve of FIGS. 1–5 in which the inner walls of the cavity in the valve body are moved to sequentially bend the vanes attached to the rotor hub of the valve to produce the same movement of the vanes within the cavity as is produced by the embodiment in FIGS. 1–5;

FIG. 8 is a vertical sectional view through a screw conveyor in which the helical blade used to move the material through the elongated container has been modified in accordance with this invention;

FIG. 9 is a vertical sectional view of a "bin-breaker" constructed in accordance with this invention, which eliminates the need for storage bins having long tapered lower sections to feed the material to an outlet; and FIG. 10 is a vertical sectional view taken along line 10—10 of FIG. 9.

Figure 1:
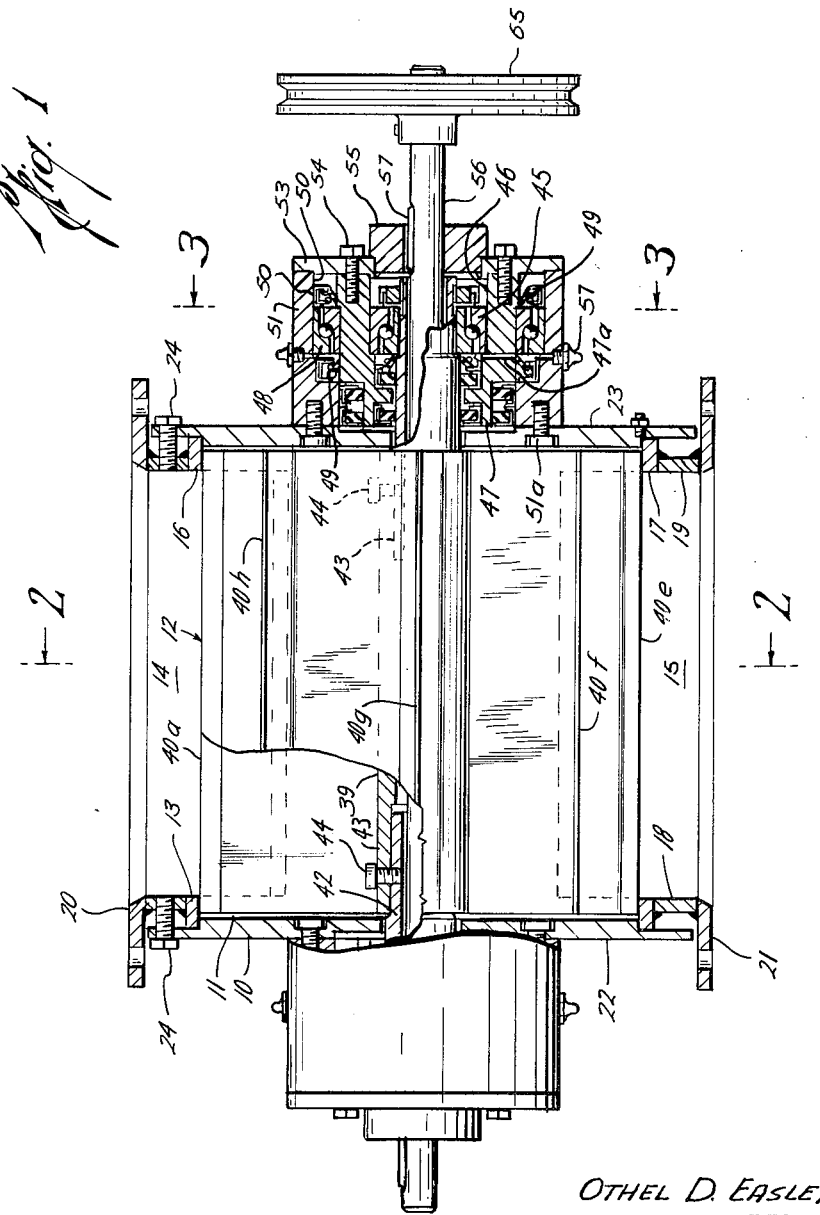
FIG. 1 is a vertical sectional view of a rotary valve constructed in accordance with this invention.
Figure 2:
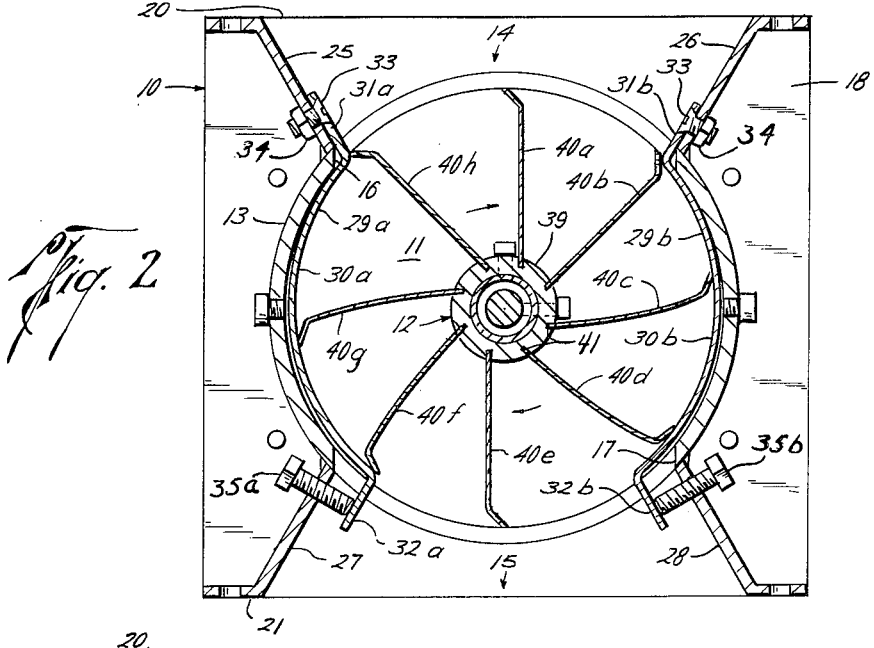
FIG. 2 is a sectional view taken along line 2—2 of FIG. 1 showing the relationship of the vanes of the rotor assembly and the cylindrical cavity in the valve body of the rotary valve of FIG. 1 and also illustrating how liners can be located in the cavity in accordance with this invention and adjusted to compensate for any wear which may occur between the end of the vanes and the liners.

Rotary valves of the type illustrated in FIGS. 1–7, have a variety of uses. They are used, for example, to transport material from one container to another as from a bin to a hopper, from a hopper to a sifter, etc. They are also used as dispensing valves for adding material at a predetermined rate to a moving stream of other material. Another common use of rotary valves is to provide an airlock between two containers having different internal pressures where it is desired to move material from one of the containers to the other.

These valves, which are also called "conveying valves" and "dispensing valves," find their greatest use in industries handling bulk materials, such as flour mills, bakeries, chemical plants, etc. They usually consist of a valve body with a cylindrical cavity, through which the material being handled passes, and a rotor assembly rotatably mounted in the cavity. The rotor has a plurality of vanes, which are spaced apart, and which divide the cavity into a number of separate compartments. The valve body is provided with an inlet and an outlet to the cavity and by rotating the rotor assembly, the compartments can be rotated past the inlet, where they are filled with material and then past the oulet where they are emptied. Whether or not the vanes contact the walls of the cavity depends upon the service in which the valve is being used. If the valve is providing an airlock, the vanes should either engage the walls or at least be close enough to the walls to restrict the flow of air sufficiently to maintain the desired differential pressure between the inlet and outlet of the valve.

The rotary valve shown in FIGS. 1–7 consists of a valve body 10, having a cylindrical cavity 11, therein, within which the rotor assembly 12 is rotatably supported by the valve body.

Valve body 10, in the embodiment illustrated, is of fabricated construction. Tubular member 13 provides the arcuate walls for cylindrical cavity 11, and inlet 14 and outlet 15 to the cavity are obtained by cutting elongated rectangular openings 16 and 17 in the tubular member. The inlet and outlet to the cavity are shown as being rectangular and diametrically opposed, but this would not need to be the case as their relative shape and positions can be changed without changing the operation of the valve. In most applications, the inlet is at the top and the outlet is at the bottom, since this allows gravity to help the material being handled to flow into and out of the valve. This arrangement also reduces the power required to operate the valve.

Encircling tubular member 13 and welded thereto at each end adjacent openings 16 and 17 are flat rectangular support members 18 and 19 which have a circular opening therein to receive the cylindrical member. These support members provide end walls for inlet 14 and outlet 15, and also support flanges 20 and 21 which are provided to connect the valve into a conduit. These members also hold end plates 22 and 23 in place closing the open ends of tubular member 13 by means of bolts 24.

To guide the material entering inlet 14 into cavity 11 and from the cavity out outlet 15, flat plates 25, 26, 27 and 28 are located between the openings in flanges 20 and 21 and openings 16 and 17 in tubular member 13. These members extend the length of the openings and are attached to support members 18 and 19 at each end. Thus all material passing through the valve will pass through cavity 11 where rotor assembly 12 is located.

As will be explained below, the vanes of the valve are arranged to be initially bent by the walls of cavity 11. Since the amount the vanes are bent affects the operating characteristics of the valve, adjustable liners 29a and 29b, which cover the inner surface of tubular member 13, are provided. The liners also provide a wear surface to protect the inner surface of the tubular member.

These liners are preferably mounted so they will yield to some extent under the force exerted on them by the vanes. This could be accomplished by placing resilient members such as coil springs or pads or spacers of resilient material such as rubber between the liners and the inner walls of cavity 11. In the embodiment illustrated, the liners are formed with arcuate mid-sections 30a and 30b, which lie adjacent the arcuate inner surface of cavity 11, and flat end sections 31a, 31b, 32a, and 32b, which extend outwardly from the arcuate mid-sections parallel to plates 25–28. Upper ends 31a and 31b are attached to plates 25 and 26 by bolts 33 and nuts 34, whereas lower ends 32a and 32b are not rigidly attached to the valve body but are engaged by screws 35a and 35b mounted in plates 27 and 28. With this arrangement, and by using a resilient material such as steel for the liners, the distance between ends 32a and 32b of the liners and plates 27 and 28 could be adjusted which, in turn, will adjust the curvature of the arcuate mid-sections of the liners. Thus the liners can be adjusted to change the amount of interference between the vanes and the liners and, also, to compensate for the wear which will occur between the liners and the vanes as the valve is used. Also by forming the arcuate sections 30a and 30b originally with a radius of curvature greater than the radius of curvature of the inner walls of tubular member 13, the liners can be bent outwardly under the force exerted on them by the vanes if necessary and then spring back when the force is released. This provides the desired resilient engagement between the vanes and the liners and also allows the liners to automatically adjust to the wear which occurs between them and the rotor assembly during the interval of time which occurs between adjustments of screws 35.

Rotor assembly 12 which controls the flow of material through cavity 11 by its speed of rotation, consists of a central hub 39 to which is attached a plurality of vanes generally indicated with the number 40, with each individual vane being indicated by the number 40 with a letter suffix.

Eight vanes are used in the embodiment shown. They are flat, relatively thin, members extending the length of cavity 11 with their outer edges in contact with the walls of the cavity. Preferably their ends do not actually engage the end plates 22 and 23 but the clearance between them should be held to a minimum.

The vanes can be attached to the central hub in any convenient manner. In the embodiment illustrated, the inner ends of the vanes are located in slots 41, a plurality of which are provided in the hub and which are equally spaced around the hub. To attach the vanes to the hub, the slots are sized so that the clearance between the vanes and the walls of the slots will cause molten metal to flow by capillary action into the space between them. To obtain capillary action the clearance should be relatively small. A clearance of .002 on the side has been used with satisfactory results. The depth of the slot depends on the width of the vane. A depth to width ratio of 3:1 has produced good results in most sizes of vanes.

After the slots are milled and the vanes installed in place, rods of the desired weld metal are then attached to the hub along the edge of the slots on each side of the vanes, and the rotor assembly is heated in a furnace until the weld metal melts and is drawn into the space provided to weld the vanes in place in the slots.

The best results have been obtained with this welding process by raising the temperature of the furnace with the hub assembly with the welding rods attached in place therein to about 100° under the melting point of the rods, holding the furnace at that temperature until the entire assembly is at the furnace temperature, then raising the temperature high enough to melt the welding rods, allowing sufficient time for the molten metal to flow into place, and then rather quickly lower the temperature. This latter step, of course, can include any quenching which may be necessary to produce the desired temper in the vanes.

In the embodiment illustrated the slots are inclined so the vanes extend outwardly from the hub in a plane which is tangent to a circle which has the longitudinal axis of the hub as its center. The outer edge of each vane is bent at an angle of about 45° to the plane of the vane to provide a wide surface to engage the wall of the cavity and to improve the seal between the vane and the body. This arrangement also tends to cause the vanes to always bend in the same direction which results in the consistent operation of the valve.

As stated above, the vanes of the material conveying apparatus of this invention are moved relative to the container in which they are located by sequentially bending the vanes against the inner walls of the container. In the rotary valve of FIGS. 1–5 this is accomplished by causing the hub 39 to rotate eccentrically. Thus, means are provided to rotatably support the hub to rotate around an axis, which is offset from the longitudinal axis of the cavity and to cause this axis of rotation to rotate around the longitudinal axis of the cavity.

Figure 3:
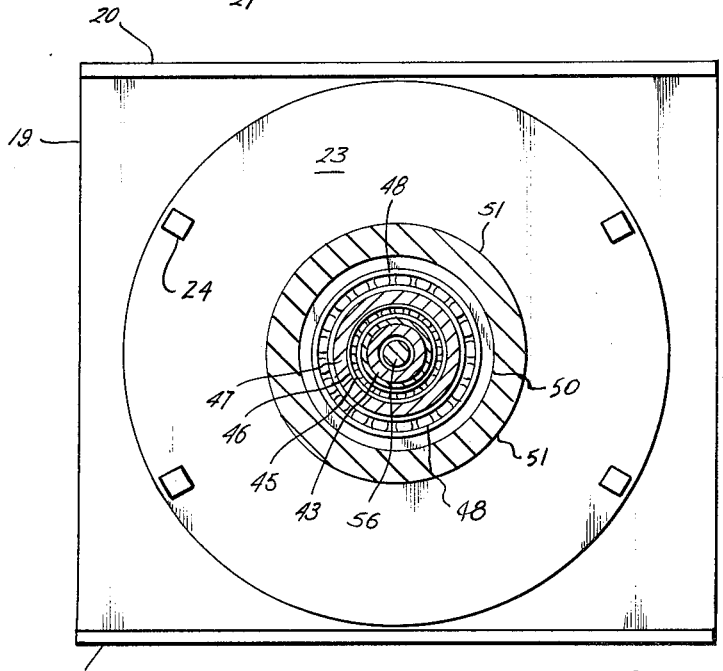
FIG. 3 is a sectional view taken along line 3—3 of FIG. 1 illustrating the mechanism for mounting the rotor assembly to rotate around the longitudinal axis of the cavity in the valve body, which produces the rotation of the vanes in the manner to be described in detail below.

Referring to FIGS. 1 and 3, hub 38, which is a tubular member, is supported by two tubular support members 42 and 43, which extend into each end of the hub. Machine screws 44 hold the support members in position in the ends of the hub. The support members extend outwardly through openings provided therefor in end plates 22 and 23 and are rotatably supported by a mechanism which is supported in turn by the end plates. Since the construction of this mechanism is the same on each end of the valve, only the righthand assembly attached to plate 23 will be described in detail.

Thus support member 43, which extends through plate 23, is rotatably supported by bearing 45, located within bore 46 of eccentric drive member 47, which, in turn, is rotatably supported by bearing 48 within bore 50 of member 51. Member 51 is attached to and supported by end plate 23 through machine screws 51a. Eccentric drive member 47 is connected to drive plate 53 by screws 54. Drive plate 53 is in turn connected to drive hub 55 as by welding. Extending through drive hub 55 is drive shaft 56, which drives hub 55 through key 57. Various oil and dust seals generally indicated by the number 49 are located on either side of the bearings and other appropriate places. Eccentric drive member 47 is provided with a plurality of holes 47a through which the grease supplied through fitting 52 can reach the inner bearing 45.

With this arrangement, by offsetting the longitudinal axis of bore 46 in eccentric drive member 47 from the longitudinal axis of the drive member itself, rotation of the member by shaft 56 will cause the longitudinal axis of the support members 42 and 43 and rotor hub 39 to rotate around the longitudinal axis of the eccentric drive member along a circular path having a radius equal to the amount the two axes are offset. By locating eccentric drive member 47, so its longitudinal axis is co-axial with the longitudinal axis of cavity 11, the longitudinal axis of the hub of rotor assembly 12 can be caused to rotate around the longitudinal axis of the cavity and it is this movement, combined with the arrangement and resiliency of the vanes carried by the hub, which causes the rotor assembly to rotate in the cavity at a fraction of the speed of the shaft. How this movement results from this arrangement is illustrated in FIGS. 4 and 5.

Shown in section in FIGS. 4 and 5 are the hub 39 of rotor asembly 12 and drive shaft 56, with vanes 40 and liners 29a and 29b, which form the inner walls of cavity 11 within the valve, shown schematically. As shown, the longitudinal axis of rotor assembly 12, indicated by the number 60, is rotating around the longitudinal axis of shaft 56 and cavity 11, indicated by the number 61, in a counterclockwise direction. All of the vanes shown are in contact with liners 29a and 29b whenever they are located between the hub and the liners, but this need not necessarily be the case as rotation can be imparted to the rotor assembly even though all of the vanes are not long enough to engage the walls of cavity 11 at all times. In discussing the vanes in contact with the walls of the cavity or with liners 29a and 29b, we are, of course, neglecting the vanes, which in the figure happen to be vanes 40a and 40e, which are extending into the inlet and outlet portions of the cavity and, therefore, would not normally engage the liners unless the liners were extended along each side of the openings. They could, of course, be long enough to engage the portions of tubular member 13 between the end of the member and openings 16 and 17. This will usually be the case when the valve is operated without liners for cavity 11.

As explained above, the vanes are made from resilient materials, such as spring steel and are designed so that they are flexible and can be bent between the hub and the valve body without exceeding their yield strength. Preferably, the vanes are designed so they will not be stressed even close to their yield strength when bent. Also, in the preferred embodiment of this invention, the lengths of the vanes are such that when the longitudinal axis of hub 60 is in the position indicated in FIG. 4, vanes 40f, 40g and 40h will be bent between the hub and liner 29a, whereas vanes 40b, 40c, and 40d will be touching the liner 29b only to the extent necessary to maintain a seal therewith. Under these conditions the bent vanes will be exerting a force on the hub tending to rotate the hub in a clockwise direction. Since the hub is free to rotate within bearing 45, it will be rotated by this force an incremental distance in the clockwise direction in order to relieve the bent vanes of the stress imposed in them by the position of the hub. This incremental movement of the hub in a clockwise direction will not move the ends of the bent vanes relative to liner 29c, but will cause the vanes 40b, 40c and 40d to move an incremental distance relative to liner 29b. Vanes 40f, 40g, and 40h cannot move relative to liner 29a since this would allow them to relieve themselves of the stress imposed on them by the eccentric hub without imparting rotation to the hub. Thus, the relative movement of the bent vanes and the liners must be held to a minimum to obtain the desired rotation of the rotor assembly.

In FIG. 5 longitudinal axis 60 has moved further in a counterclockwise direction until it is approximately adjacent vane 40f which is now bent to the extent that vane 40g was bent in FIG. 4. Vanes 40b, 40c and 40d have moved a distance "X" from the position shown in the dotted lines which correspond to their position in FIG. 4. The distance moved by these vanes may not be the same, that is X1 may not equal X2 or X3, but they will each move some incremental distance.

With the vanes in the position shown in FIG. 5 this process will be repeated with vanes 40b and 40c moving another incremental distance due to the bending of vanes 40f and 40g. Whether or not vanes 40h and 40d move or are bent in this position will depend on several factors, including the amount of interference between the vanes and the liners.

Speed reductions up to 60 to 1 can be obtained with this mechanism. The amount of reduction obtained depends, of course, on the distance "X" moved by each vane per revolution of axis 60 and this will vary with many factors such as the number of vanes which are bent between the hub and the liners with each revolution of axis 60. Motion can be imparted to the hub if only one vane is bent each revolution. Doubling the number bent will double the speed of the hub if nothing else is changed. Other factors are the amount of interference, the flexibility of the vanes, the angle the force is applied to the hub, the amount of eccentricity, etc.

By way of example of some of these factors, in a commercial embodiment of a 10" rotary valve, the eccentricity was .040 inch with the vanes having about a sixteenth of an inch interference with the liners when they were at the midpoint of their travel toward and away from the liners.

Generally speaking, the rotation of rotor assembly 12 will be opposite that of the shaft. In the embodiment illustrated, if the rotation of the shaft was reversed, the rotation of the hub would tend to reverse also, however, in the particular embodiment illustrated the arrangement of the vanes is such that it would not lend itself too well to a reversal of directions of rotation. This is because the vanes are arranged to be tangent to a circle having the longitudinal axis of the hub as its center so that the force they exert on the hub creates a torque which tends to rotate the hub in the desired direction. Therefore, for a smooth operation of this embodiment, preferably the shaft is rotated in the direction indicated.

When the valve is operating as an airlock or is handling material which could be damaged by being caught between the ends of the vanes and the walls of the cavity, each vane is long enough to engage the walls of the liner when in position to do so. This insures that a sliding seal is maintained between the vanes and the walls of the cavity to provide the seal necessary to maintain the desired pressure differential across the valve. Also, it results in the bending of all of the vanes in contact with the walls of the cavity with each revolution of the input shaft. This produces a vibratory motion in the vanes which causes the vanes to knock the material out of their way as they move in incremental steps around the cavity, thus tending to keep the material from being damaged between the ends of the vanes and the cavity.

This feature also allows the valve to handle certain materials which a conventional valve could not handle and which would gum up on the vanes if it were not for this vibration imparted to them by the manner in which they are driven.

Shaft 56 is shown in FIG. 1 with a V-belt pulley 65 attached thereto through which it may be driven. V-belt drives are, of course, much more economical to purchase and to operate than are the roller chain belt drives which were heretofore used when speed reducers were necessary and the power being transmitted to the shaft of the rotor assembly was low speed, high torque, power. With the valve of this invention, since the input power to shaft 56 is relatively high speed, low torque, power, it can be driven directly or a conventional V-belt drive can be used between the shaft and the drive motor. This latter arrangement would allow a convenient one step speed reduction to be made between the drive motor and the drive shaft. Also, any of the well-known, economical, simple variable, speed drives can be used.

Since these valves are frequently used in dusty atmospheres, it is particularly advantageous to be able to eliminate the roller chain drive belt which required lubrication and which, therefore, had to be enclosed and protected from the dust.

FIGS. 6 and 7 illustrate schematically an alternate method of driving a rotary valve of the type described above. In this embodiment, rather than moving the hub member toward the inner arcuate walls of the container, to bend the vanes, the walls are moved toward the hub. Various ways could be arranged to accomplish this. In the figures, the inner arcuate walls, 70a and 70b are arranged to pivot around axes 71a and 71b, respectively, and drive means, solenoids 72a and 72b are provided to cause them to oscillate around the axes. One drive means could be used to provide the movement, if desired, by simply connecting its shaft to both walls. Where two drive means are used, they preferably operate 180° out of phase so that when one is extended the other will be withdrawn in the manner illustrated in the drawing. The dotted lines indicate the mid-point in the oscillation of the walls.

In this embodiment, central hub 73 is mounted to freely rotate around the longitudinal axis of the cavity. Since it is not driven it can be reduced in diameter and made from solid stock. The vanes 74 are attached to the hub in the same way as before, however, being located in slots 75 provided therefor in the hub.

The vanes move around the cavity formed by the walls 70a and 70b in the same manner as was described above except that vanes on opposite sides of the hub are bent at the same time. Thus, in FIG. 6, solenoid 72a is retracted and solenoid 72b is extended thereby bending vanes 74d and 74h principally. Vanes 74g and 74c are also bent to some extent. The bent vanes cause hub 73 to rotate and move vanes 74f and 74b an incremental distance, X, as shown in FIG. 7.

In FIG. 7 the walls have pivoted to the other end of their travel bending vanes 74b and 74f which will result in an incremental movement of vanes 74d and 74h and possibly 74g and 74c to some extent.

FIGS. 8 and 9 illustrate how the invention can be embodied in a screw type conveyor. In this embodiment the longitudinal axis of central hub 80 is caused to rotate around the longitudinal axis of the container 81 in the same manner as this was accomplished in the rotary valve of FIGS. 1–5. This causes the individual vanes 82 to be bent against the inner walls of container 81 which in turn results in their movement around the cavity 83 in the container in the manner described above. The vanes are arranged on hub 80 as a helix to move the material along the cavity in the manner of a screw conveyor.

FIGS. 10 and 11 illustrate how the invention can be embodied in a bin-breaker. The purpose of bin-breakers is to keep the material in the bin or container from piling up around the outlet and never leaving the container. It is particularly important that this not happen where the material may spoil or otherwise deteriorate with time. For this reason, it is common practice to taper the lower sections of storage bins at an angle equal to or greater than the angle of repose of the material to be handled to insure that it all flows smoothly from the inlet to the outlet.

By providing a bin-breaker which will move the material laterally toward the outlet, the need for the long, tapered lower section on storage tanks is eliminated which results in a considerable savings in the space which must be provided for storage bins.

In the embodiment illustrated, four vanes 90a, 90b, 90c and 90d are attached to a central hub 91 located in the bottom of bin 92. The hub is rotatably mounted on bearings 93 and driven by the motor 94 through a drive system 95, such as the one described in connection with the rotary valve of FIGS. 1–5, to cause its longitudinal axis to rotate around the longitudinal axis of cavity 96 in the bin. This causes the vanes to move along the bottom of the bin, in the manner described above, and move the material adjacent the bottom toward outlet 97.

In both the screw conveyor and the bin-breaker the walls could be arranged to do the bending of the vanes in the manner described in connection with the rotary valve of FIGS. 6 and 7.

Further, the invention has been described and illustrated with embodiments wherein the vanes or arms are arranged to be bent between their inner and outer ends. This is not necessary since the same movement could be obtained by bending only a portion of the vanes, for example only a short section adjacent their ends. In fact, this may be the better arrangement where the arms are long, such as will be the case with many bin-breakers.

From the foregoing, it will be seen that this invention is one well adapted to attain all of the ends and objects hereinabove set forth, together with other advantages which are obvious and which are inherent to the structure and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Conveying apparatus for moving material through a container, comprising, a hub member mounted to rotate freely in the container; a plurality of radially extending flexible arms attached to the hub; and means for periodically bending at least one of the arms to cause the arm to rotate the hub member an incremental distance each time the arm is bent.

2. Conveying apparatus for moving material through a container having arcuate inner walls forming at least a portion of a passageway therethrough for the material, comprising, a member rotatably mounted in the passageway, a plurality of flexible arms attached to and extending radially from the member toward the arcuate walls; means for sequentially bending the arms between the arcuate walls and the member by oscillating one of the latter toward and away from the other to cause the arms to rotate the member within the container.

3. Conveying apparatus for moving material through a container having a passageway therethrough for the material and arcuate inner walls forming at least a portion of the passageway, comprising, a member mounted to rotate freely in the passageway of the container; a plurality of arms attached to the member and radially extending therefrom; and means for sequentially bending a portion of the arms between the member and the arcuate inner walls of the passageway to rotate the member within the passageway and cause the arms to carry material through the passageway.

4. Apparatus for conveying material, comprising, a conduit having walls forming an enclosed passageway for the material; a member mounted to rotate within the passageway; a plurality of radially extending arms attached to the member; and means for causing the distance between a point on the member and the adjacent wall of the conduit to be alternately lengthened and shortened sufficiently to sequentially bend at least one of the arms between the member and the walls of the conduit to cause the arm while bent to exert a force on the member tending to rotate the member relative to the conduit.

5. The apparatus of claim 4 in which means are provided to cause the longitudinal axis of the member to rotate around the longitudinal axis of the passageway.

6. The apparatus of claim 4 in which a portion of the walls of the conduit move toward and away from the member.

7. Material conveying apparatus, comprising, a container having arcuate inner wall sections arranged to form at least a portion of a passageway through the container for the material; a rotor assembly rotatably mounted in the cavity including a central hub with a plurality of radially extending flexible vanes attached thereto; means pivotally mounting at least one of the arcuate inner wall sections to pivot around an axis parallel to the longitudinal axis of the rotor assembly; and means for oscillating the pivotally mounted wall sections to sequentially bend the vanes between the hub and the oscillating wall sections to cause the bent vanes to rotate the hub around its longitudinal axis.

8. Material conveying apparatus, comprising, a container having arcuate inner walls arranged to form an internal cylindrically shaped cavity with an inlet and an outlet; a rotor assembly located in the cavity, and means for rotatably supporting the rotor assembly in the cavity with its axis of rotation parallel to and spaced from the longitudinal axis of the cavity; said assembly including a central hub with a plurality of radially extending, flexible vanes attached thereto; means for rotating the longitudinal axis of rotation of the rotor assembly about the longitudinal axis of the cavity with the axis of rotation of the rotor assembly spaced from the longitudinal axis of the cavity sufficiently to bend at least one of the vanes between the hub and the inner arcuate walls of the container during each revolution of the axis of the rotor assembly, with the remaining vanes positioned to allow the force exerted on the hub by the bent vane to rotate the hub an incremental distance relative to the container.

9. Material conveying apparatus, comprising, a container having inner arcuate walls to provide a cavity therein of generally circular cross-section with an inlet and an outlet to the cavity; a rotor assembly located in the cavity and including a central hub with a plurality of radially extending flexible vanes attached thereto; means for rotatably mounting the rotor assembly to rotate around an axis parallel to and spaced from the longitudinal axis of the cavity; and means for rotating the axis around which the rotor assembly rotates, around the longitudinal axis of the cavity, said axes being spaced apart a sufficient distance to cause a portion of the vanes to be successively bent between the hub and the inner walls of the container.

10. The material conveying apparatus of claim 9 in which the plurality of radially extending flexible vanes are parallel to the longitudinal axis of the hub and tangent to a circle located with its center on the longitudinal axis of the hub; to provide a moment arm for the force exerted on the hub by the vanes, equal to the radius of the circle.

11. The material conveying apparatus of claim 9 in which the radially extending flexible vanes are arranged on the hub to spiral through the cavity.

12. The material conveying apparatus of claim 9 in which the longitudinal axis of the cavity is vertical with the cavity having an upper and lower end and in which the vanes extend horizontally adjacent the lower end of the cavity.

13. Material conveying apparatus, comprising, a container having arcuate walls to form a cavity therein of generally circular cross-section and an inlet and an outlet communicating with the cavity; a rotor assembly located in the cylindrical cavity including a central hub with a plurality of vanes attached thereto; means for rotatably supporting the rotor assembly in the cavity and means for causing the longitudinal axis of the rotor assembly to oscillate with respect to the longitudinal axis of the cavity to alternately move each vane toward and away from the longitudinal axis of the cavity with at least one of the vanes extending from the hub far enough to be bent between the hub and the arcuate walls of the cavity when the hub moves it away from the longitudinal axis of the cavity to cause the vane to exert a force on the hub tending to rotate the hub relative to the container.

14. Material conveying apparatus, comprising, a container having arcuate walls to provide a cavity therein of circular cross-section having an inlet and an outlet for the material; a rotor assembly located in the cavity including a hollow hub having attached thereto a plurality of radially extending flexible vanes a portion of which are in engagement with the arcuate walls of the cavity; support means for rotatably supporting the hub with its longitudinal axis offset from the longitudinal axis of the cavity; means for rotatably mounting the support means to rotate around the longitudinal axis of the cylindrical cavity to cause the longitudinal axis of the hub to rotate around the longitudinal axis of the cavity and successively bend the vanes between the hub and the arcuate walls of the cavity causing each bent vane to exert a force on the hub, tending to rotate the hub on the support means.

15. The apparatus of claim 14 in which the vanes lie in planes which are tangent to a circle whose center is the longitudinal axis of the hub to which they are attached.

16. The apparatus of claim 14 in which the outer ends of the vanes which engage the arcuate walls of the cavity are bent out of the plane of the vanes in a direction opposite to the direction of travel of the hub to which they are attached.

17. The apparatus of claim 14 in which the support means are driven by a shaft which extends through the hollow hub.

18. The apparatus of claim 14 in which the cavity in the container is provided with two liners, each being located on one side of the cavity and covering the arcuate walls from the inlet to the outlet, means for mounting the liners in the cavity to allow the liners to resiliently engage the vanes.

19. The apparatus of claim 18 in which the liners are initially formed with a radius of curvature greater than the radius of curvature of the arcuate walls of the cavity.

20. A rotary valve, comprising, a valve body having an opening with arcuate walls to provide a cavity therein of circular cross-section and an inlet and an outlet to the cavity; a rotor assembly located in the cavity including a hollow hub member and a plurality of radially extending, resilient vanes each vane extending outwardly far enough to engage the arcuate walls of the body and longitudinally substantially the length of the cavity to divide the cavity into a plurality of compartments; a support member for rotatably supporting the hub with its longitudinal axis offset from the axis of rotation of the support member; means for rotatably supporting the support member with its longitudinal axis co-axial with the longitudinal axis of the cavity; and means for rotating the support member relative to the hub to rotate the longitudinal axis of the hub around the longitudinal axis of the cavity to successively bend the vanes located between the hub and the arcuate walls of the cavity to cause the vanes to exert a turning torque on the hub.

21. The rotary valve of claim 20 further provided with two arcuate liners which cover the arcuate walls of the cavity between the inlet to the outlet each of which is adjustably attached to the body to allow the radius of curvature of the liners to be changed as required to accommodate any wear between the vanes and the liners.

22. The rotary valve of claim 20 in which the ends of the vanes adjacent the arcuate walls of the cavity are bent out of the planes of the vanes in a direction opposite to the direction of rotation of the support member.

23. The rotary valve of claim 20 in which the vanes lie in planes tangent to a circle which has its center on the axis of rotation of the rotor assembly.

References Cited by the Examiner
UNITED STATES PATENTS

| | | | |
|---|---|---|---|
| 1,255,275 | 2/1918 | Barnett et al. | 198—213 X |
| 1,696,041 | 12/1928 | Kreutzberg. | |
| 2,716,276 | 8/1955 | Brown | 29—487 |
| 2,758,481 | 8/1956 | Mouravieff | 74—116 |
| 2,806,636 | 9/1957 | Richards | 222—368 X |
| 2,891,685 | 6/1959 | Ball | 214—17.68 |
| 2,960,245 | 11/1960 | Knapp | 214—17.68 |
| 3,060,563 | 10/1962 | Berg | 29—487 |

GERALD M. FORLENZA, *Primary Examiner.*

HUGO O. SCHULZ, *Examiner.*